US012191562B2

(12) United States Patent
Lee (10) Patent No.: US 12,191,562 B2
(45) Date of Patent: Jan. 7, 2025

(54) RADAR END-FIRE ANTENNA ARRAY WITH EXPANDED DETECTION FIELD

(71) Applicant: Toyota Motor Engineering & Manufacturing North America, Inc., Plano, TX (US)

(72) Inventor: Jae Seung Lee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 480 days.

(21) Appl. No.: 16/778,666

(22) Filed: Jan. 31, 2020

(65) Prior Publication Data

US 2024/0405416 A1    Dec. 5, 2024

(51) Int. Cl.
  *H01Q 1/42*   (2006.01)
  *G01S 7/03*   (2006.01)
  *H01Q 21/06*  (2006.01)

(52) U.S. Cl.
  CPC ............. *H01Q 1/42* (2013.01); *G01S 7/03* (2013.01); *G01S 7/032* (2013.01); *H01Q 21/067* (2013.01)

(58) Field of Classification Search
  CPC ...... H01Q 1/42; H01Q 21/067; H01Q 21/065; H01Q 21/28; G01S 7/03; G01S 7/032
  See application file for complete search history.

(56) References Cited

U.S. PATENT DOCUMENTS

| 4,737,788 | A |   | 4/1988  | Kennedy |
| 5,874,915 | A | * | 2/1999  | Lee ................... H01Q 21/205 342/372 |
| 8,970,423 | B2 |  | 3/2015  | Kabrt et al. |
| 9,917,355 | B1 | * | 3/2018 | Lee ....................... H01Q 21/20 |
| 10,020,590 | B2 |  | 7/2018 | Schmalenberg et al. |
| 10,141,636 | B2 |  | 11/2018 | Lee |
| 2019/0348759 | A1 | * | 11/2019 | Walker .................. H01Q 21/205 |

FOREIGN PATENT DOCUMENTS

CN    102653218 A    9/2012

OTHER PUBLICATIONS

"Radar Basics—The Radar Equation.pdf" from https://web.archive.org/web/20190302201003/https://www.radartutorial.eu/01.basics/The%20Radar%20Range%20Equation.en.html (Year: 2019).*

(Continued)

*Primary Examiner* — Vladimir Magloire
*Assistant Examiner* — Yonghong Li
(74) *Attorney, Agent, or Firm* — Christopher G. Darrow; Darrow Mustafa PC (57) ABSTRACT

A radar device can be configured to provide an expanded detection field. The radar device can include a plurality of end-fire antennas. The plurality of end-fire antennas can be arranged in a fan-shaped array such that the plurality of end-fire antennas extending radially outward from a central region. Each end-fire antenna can have a transmission end oriented in a different direction than the other end-fire antennas. The plurality of end-fire antennas creating a collective detection field, which is larger than the detection field provided by any individual end-fire antenna. The radar device can be carried on a vehicle, such as an aircraft or a watercraft. For instance, the radar device can be used in connection with a helicopter, particularly when landing.

21 Claims, 9 Drawing Sheets

(56) References Cited

OTHER PUBLICATIONS

"Antenna Theory End-fire Array.pdf" (from https://web.archive.org/web/20160913141500/https://www.tutorialspoint.com/antenna_theory/antenna_theory_end_fire_array.htm (Year: 2016).*
"Lowest safe altitude—Wikipedia.pdf" (from https://web.archive.org/web/20191027022738/https://en.wikipedia.org/wiki/Lowest_safe_altitude (Year: 2019).*

* cited by examiner

RADAR END-FIRE ANTENNA ARRAY WITH EXPANDED DETECTION FIELD

FIELD

The subject matter described herein relates in general to radar and, more particularly, to the use of multiple radars to achieve an expanded detection field.

BACKGROUND

During a helicopter landing, physical structures (e.g., electric wires/cables, buildings, trees, etc.) at or near the landing site can become deadly if they are not detected. Radar is a critical sensor for detecting such obstacles. However, prevailing environmental conditions may affect radar performance. For instance, extreme weather conditions or smoky/dusty environments can adversely affect radar performance. Further, the downwind created by the helicopter blades can also adversely affect radar performance.

SUMMARY

In one respect, the present disclosure is directed to a radar device. The radar device can include a plurality of end-fire antennas. The plurality of end-fire antennas can be arranged in a fan-shaped array. The plurality of end-fire antennas can extend radially outward from a common region. Each end-fire antenna can have a transmission end oriented in a different direction than the other end-fire antennas. The plurality of end-fire antennas can create a collective detection field.

In another respect, the present disclosure is directed to a system. The system can include a vehicle and a radar device carried on the vehicle. The radar device can include a plurality of end-fire antennas. The plurality of end-fire antennas can be arranged in a fan-shaped array. The plurality of end-fire antennas can extend radially outward from a common region. Each end-fire antenna can have a transmission end oriented in a different direction than the other end-fire antennas. The plurality of end-fire antennas can create a collective detection field.

DETAILED DESCRIPTION

Arrangements described herein are directed to the use of a plurality radar end-fire antennas to achieve an expanded detection field. The plurality of end-fire antennas can be arranged in a fan-shaped array. Each of the end-fire antennas can transmit in different direction than the other end-fire antennas. Arrangements described herein can expand the use of automotive radar (with end-fire antennas) to other industries, potentially achieving a lower cost and without the use of moving parts for the radar scan.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Arrangements described herein are directed to the use of automotive radar in non-automotive applications, particularly helicopter and/or other aircraft applications. Automotive radar is described in U.S. Pat. Nos. 10,141,636; 10,020,590; and 9,917,355, which are incorporated herein by reference in their entirety. It will be appreciated that the any of the automotive radar described in these references, alone or in any combination, can be implemented in connection with the arrangements described herein.

Figure 1A:
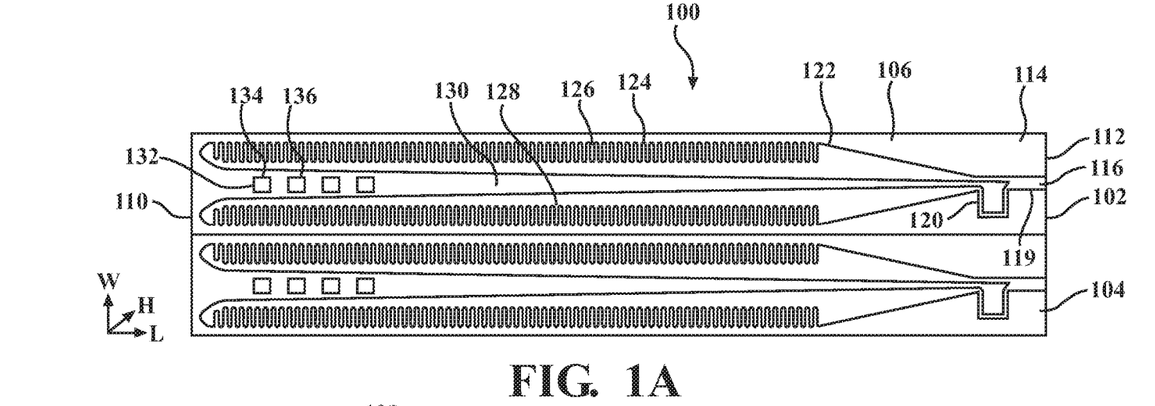
FIG. 1A is an example of a top view of two end-fire antennas of an end-fire antenna array.
Figure 1B:
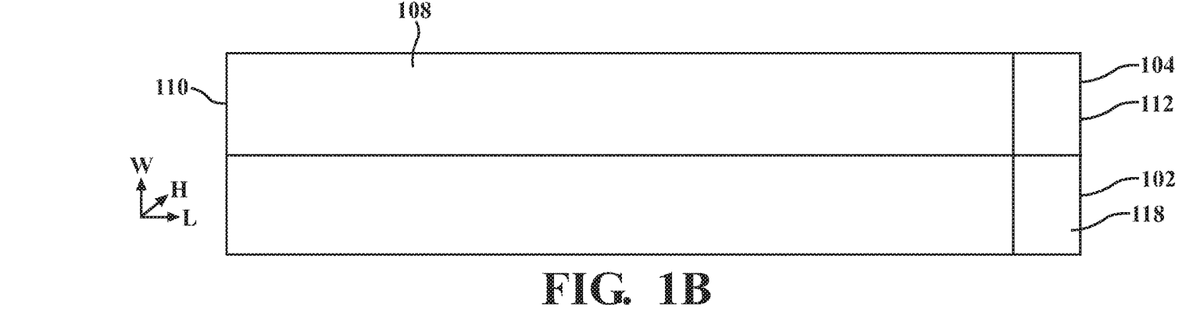
FIG. 1B is an example of a bottom view of the end-fire antenna array of FIG. 1A.
Figure 1C:
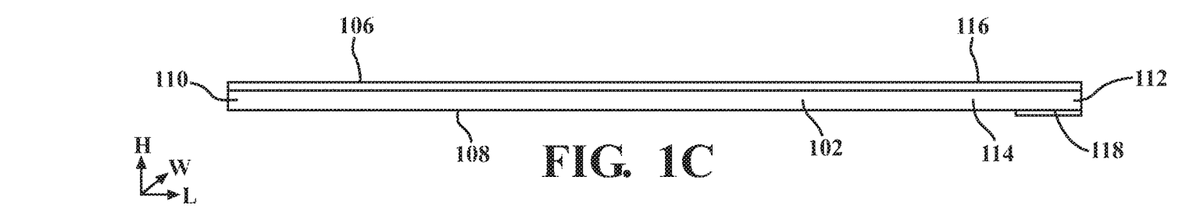
FIG. 1C is an example of a side view of the end-fire antenna array of FIG. 1A.

Turning now to FIGS. 1A-1C, an example of an end-fire antenna array 100 is shown. The end-fire antenna array 100 can be included in an aircraft radar system or other radar system. An L-W-H axis is shown in various drawings to illustrate directions corresponding to a length, a width, and a height of an aircraft radar system (e.g., a helicopter radar system) or other radar system. Although features are described with reference to the length, the width, and the height, it will be understood that the aircraft radar system or other radar system can be oriented in any direction such that, for example, a height can be referred to as a length and so forth. Thus, it will be understood that the L-W-H axis is used for convenience to facilitate the discussion.

The end-fire antenna array 100 can include a plurality of end-fire antennas. For this example, the end-fire antenna array 100 can include a first end-fire antenna 102 and a second end-fire antenna 104. However, it will be understood that the end-fire antenna array 100 can include more than two end-fire antennas. As an example, in one or more arrangements, the antenna array 100 can include between 2 and 32 end-fire antennas.

The end-fire antenna array 100, and thus the first end-fire antenna 102 and the second antenna 104, can have a top 106 and a bottom 108. The terms "top" and "bottom" are merely used for convenience to facilitate the discussion and are not intended to be limiting. It will be appreciated that the top 106 and the bottom 108 of the end-fire antenna array 100 can be oriented in any direction.

The first end-fire antenna 102 can include a metal 116 inside of or on a printed circuit board (PCB) 114. The metal 116 can be, for example, a metal trace printed on the PCB 114. The first end-fire antenna 102 can include a transmission end 110 and a chip connection end 112. The transmission end 110 can be an end of the first end-fire antenna 102 from which signals propagate into the atmosphere. The chip connection end 112 can be an end of the first antenna 102 from which a signal propagates from a radio frequency integrated circuit (RFIC) toward the first end-fire antenna 102.

A signal from a controller, such as an RFIC designed to transmit signals in a radio frequency, can be received by the first end-fire antenna 102 at the chip connection end 112. The signal can propagate through the first end-fire antenna 102 toward the transmission end 110. From the transmission end, the signal can be wirelessly transmitted into the atmosphere in the longitudinal direction (i.e., in the negative L direction).

Similarly, a wireless signal (such as a signal reflected off of an object) can be received by the first end-fire antenna 102 at the transmission end 110 and can propagate through the first end-fire antenna 102 to the chip connection end 112. The signal can then be received by the controller and analyzed by the controller to determine features of the object from which it was reflected.

The metal 116 of the first end-fire antenna 102 can include tin, gold, nickel, any other conductive metal, or any combination thereof. There can be metal on the bottom 108 of the first end-fire antenna 102, which can form a ground structure 118. The ground structure 118 can be electrically isolated from the metal 116 on the top 106 of the first end-fire antenna 102 and can be connected to an electrical ground.

The metal 116 on the top 106 of the first end-fire antenna 102 can form an antenna structure including a chip connection lead 119, a balun 120, a tapered section 122, and a wave section 124. In some embodiments, the metal 116 on the top 106 of the first end-fire antenna 102 can also form one or more beam adjustment features 132 including a first beam adjustment feature 134 and a second beam adjustment feature 136. The first end-fire antenna 102 and the second antenna 104 can each be referred to as tapered slot end-fire antennas.

The chip connection lead 119 can be electronically connected and/or operatively connected to a controller, such as an RFIC, that controls operation of the end-fire antenna array 100. The balun 120 can function as a transformer and convert an unbalanced signal to a balanced signal and/or can convert a balanced signal to an unbalanced signal. The tapered section 122 can be tapered from the wave section 124 to the balun 120. The converted signal can propagate through the tapered section 122 toward the wave section 124.

The wave section 124 can include a first wave section 126 and a second wave section 128 separated by a space 130. The design of the wave section 124 can allow the signal propagating toward the transmission end 110 to continue to propagate beyond the wave section 124 in a wireless manner.

The beam adjustment features 132 can be included or adjusted to alter characteristics of a signal transmitted by the first end-fire antenna 102. The beam adjustment features 132 can be positioned within the space 130. The beam adjustment features 132 can have any shape such as the square shape that is shown, a triangular shape, a parallelogram shape, or the like. The beam adjustment features 132 can be electrically isolated from the other metal 116 on the top 106 of the first end-fire antenna 102 or can be in electrical contact with the other metal 116.

Figure 1D:
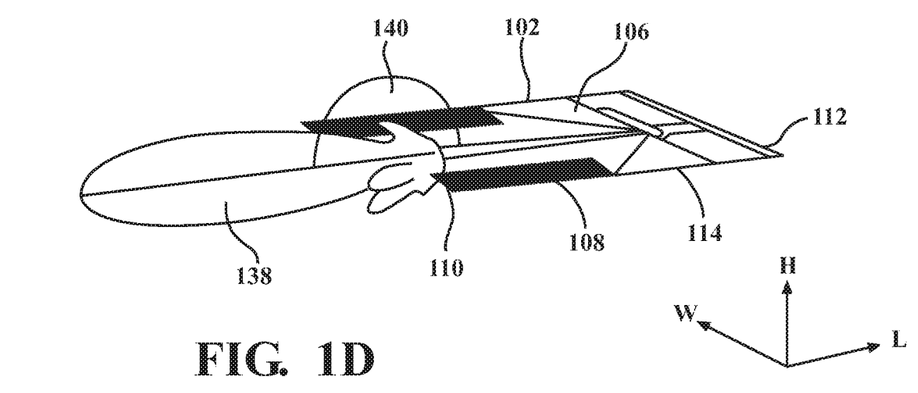
FIG. 1D is an example of a shape of a radar beam transmitted by one of the end-fire antennas of FIG. 1A.

Turning to FIG. 1D, the first end-fire antenna 102 can function as an end-fire antenna because it transmits a signal or a beam 138 that propagates in a direction parallel to a longitudinal direction of the first end-fire antenna 102 (i.e., in the negative L direction). This is distinguished from a signal transmitted by a broadside antenna that propagates perpendicular to a longitudinal direction of an antenna (i.e., in the positive H direction).

Referring to FIGS. 1A and 1D, the beam adjustment features 132 can be varied to adjust characteristics of the beam 138. For example, a quantity of the beam adjustment features 132, a shape of the beam adjustment features 132, and/or dimensions of the beam adjustment features 132 can be selected to achieve desirable characteristics of the beam 138. In some arrangements, the quantity, the shape, and/or the dimensions of the beam adjustment features 132 can be selected in order for the beam 138 to form a desired angle 140 with the top 106 or the bottom 108 of the PCB 114.

Returning reference to FIGS. 1A, 1B, and 1C, bandwidths for automotive radar systems can be substantially 80 gigahertz (GHz), such as between 77 GHz and 79 GHz. In one or more arrangements, bandwidths for automotive radar systems can be 80 GHz plus or minus seven percent (7%). The end-fire antennas can provide desirable characteristics at these bandwidths. The end-fire antennas can be positioned substantially adjacent to each other, as shown in FIG. 1A, in order to form a beam that scans essentially in two dimensions.

In order to obtain desirable antenna properties of signals having bandwidths in the automotive spectrum, the substrate of the end-fire antenna array 100 (i.e., the PCB 114) can be relatively thin. For example, the first end-fire antenna 102 (including the PCB 114) can have a height of 0.127 mm in the H direction, a width of 2.5 mm in the W direction, and a length of 10 mm to 30 mm in the L direction.

Figure 2:
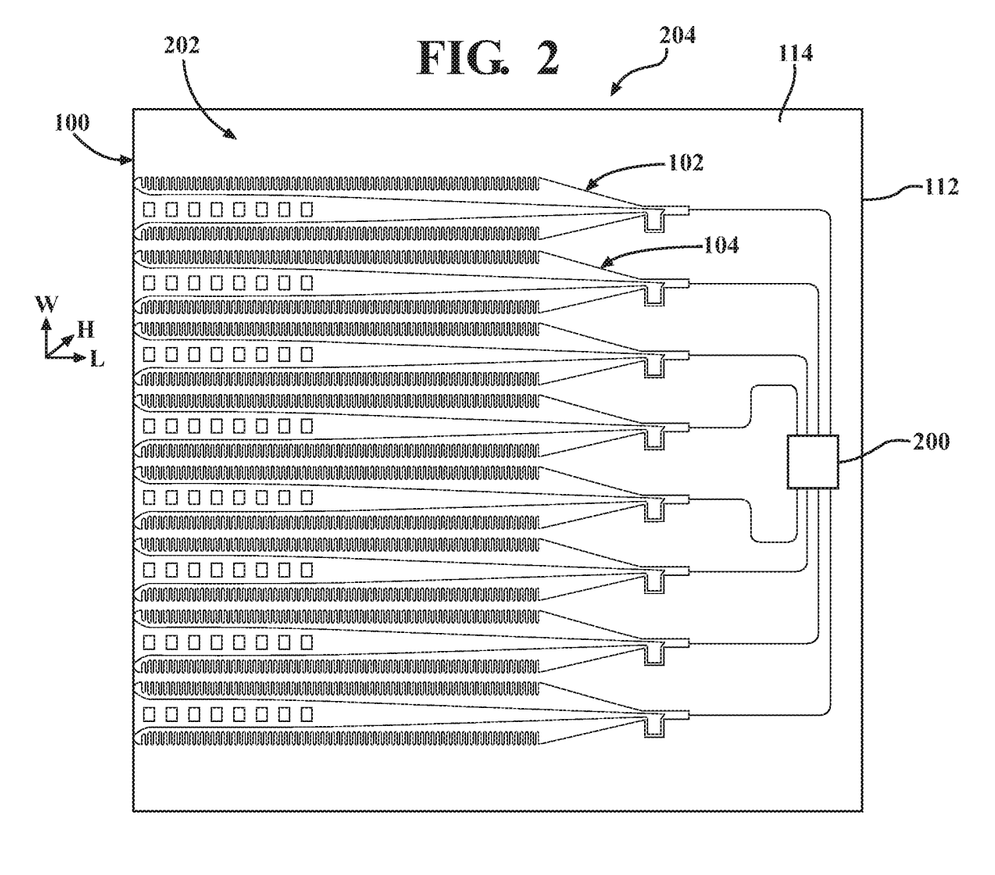
FIG. 2 is an example of a radar subsystem having the end-fire antenna array and a radio frequency integrated circuit coupled to the end-fire antenna array.

Turning now to FIG. 2, the aircraft radar system or other radar system can include a radar subsystem 204. The aircraft radar system or other radar system can include the end-fire antenna array 100 that includes a plurality of end-fire antennas 202. The aircraft radar system or other radar system can also include an RFIC 200. The RFIC 200 can be connected to each of the plurality of end-fire antennas 202 of the end-fire antenna array 100. The RFIC 200 can be connected to the PCB 114, and thus the plurality of end-fire antennas 202, in any of a variety of manners such as flipchip bonding, wire bonding, or the like.

The RFIC 200 can control operation of each of the plurality of end-fire antennas 202. For example, the RFIC 200 can transmit a signal to each antenna of the plurality of end-fire antennas 202, which, in turn, can be wirelessly transmitted by the corresponding antenna.

The RFIC 200 can control the plurality of end-fire antennas 202 to transmit one or more radar beams. For example, at least some of the signals transmitted by the RFIC 200 to each of the plurality of end-fire antennas 202 can have a different phase. When the signals have a different phase and are transmitted into the atmosphere, the combined signals can form a radar beam.

When the beam reaches an object away from the radar subsystem 204, the beam can reflect from the object and travel toward the aircraft radar system or other radar system. The reflected beam can be received by the plurality of end-fire antennas 202 and/or other end-fire antennas and can be transmitted from the antennas to the RFIC 200. In some embodiments, the RFIC 200 can analyze the received beam that was reflected from the object and determine characteristics of the object based on the reflected beam. In some embodiments, the RFIC 200 can relay the received beam to another processing unit.

Because the plurality of end-fire antennas 202 of the aircraft radar system or other radar system are positioned in a linear manner with respect to each other, the radar subsystem 204 can scan in two dimensions. In one or more arrangements, the beam 138 can have a coverage area of about 18 degrees by about 120 degrees. While the beam 138 may not be two dimensional, the 18 degree component is considered to be sufficiently small such that the beam 138 is effectively two dimensional.

According to arrangements herein, a plurality of two-dimensional radar boards with end-fire antennas can be arranged in an array such that end-fire antennas are positioned in different directions with respect to each other. As a result, the radar boards can collectively scan in three dimensions. Thus, it will be appreciated that the plurality of automotive radars can expand the detection field into three dimensions. The plurality of radar boards with end-fire antennas can be arranged in various arrays to achieve an expanded radar detection field. Various non-limiting examples of radar arrays will be described herein.

Figure 3:
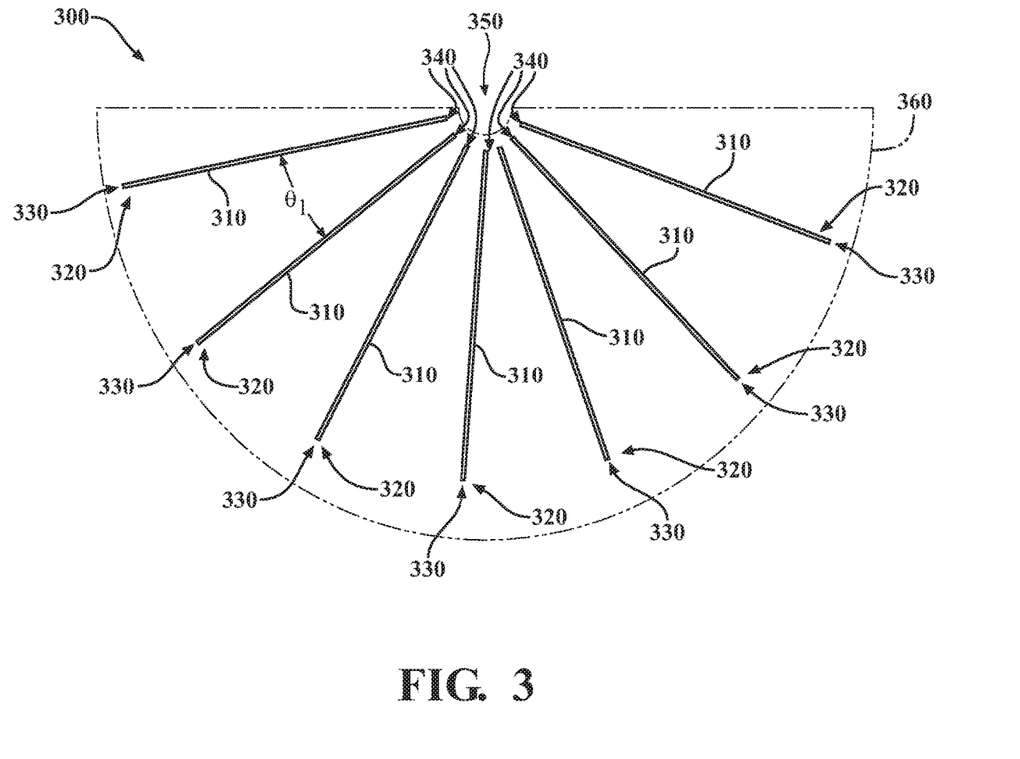
FIGS. 3-5 show different views of an example of a first array of radar boards.
Figure 4:
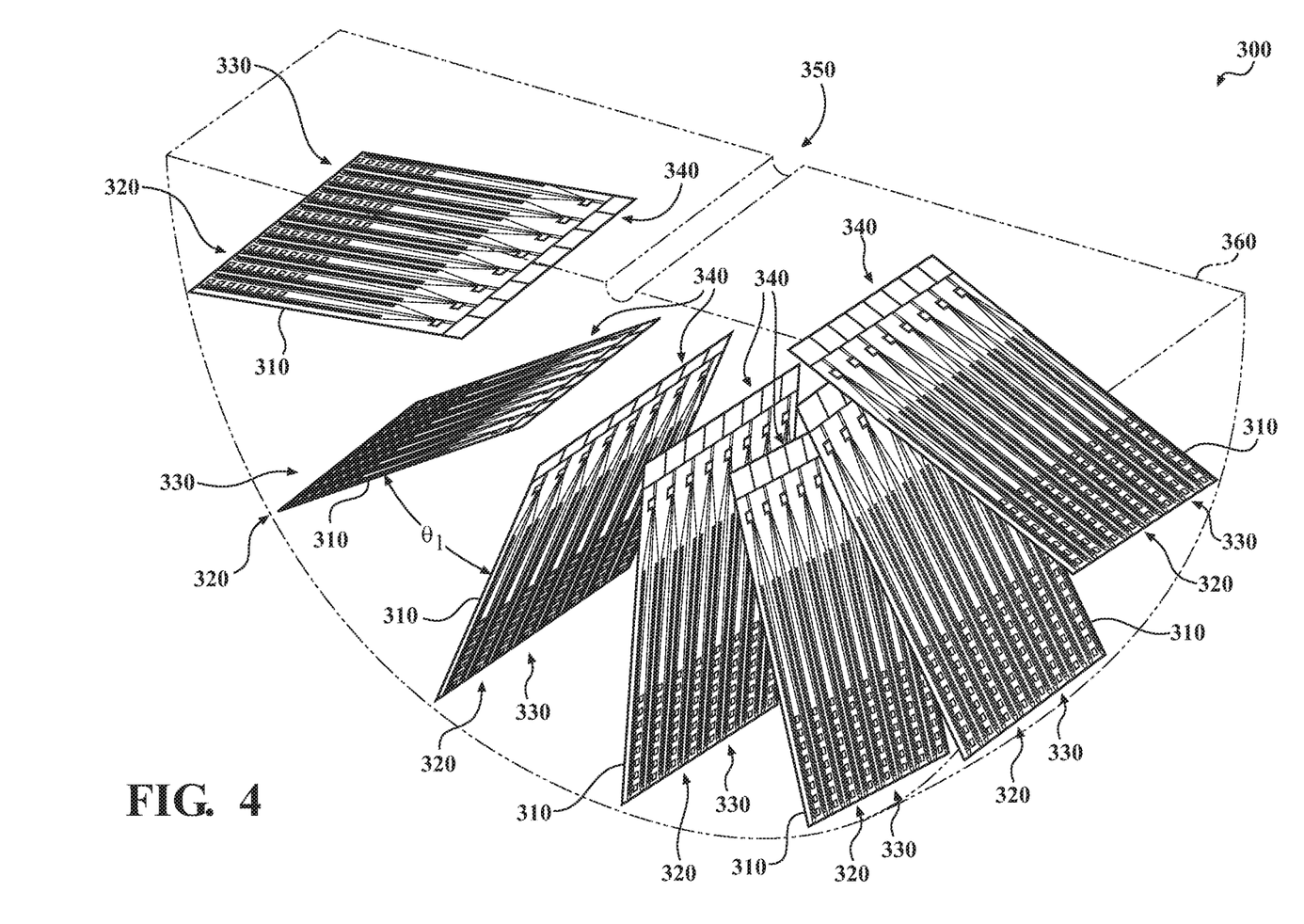
Figure 5:
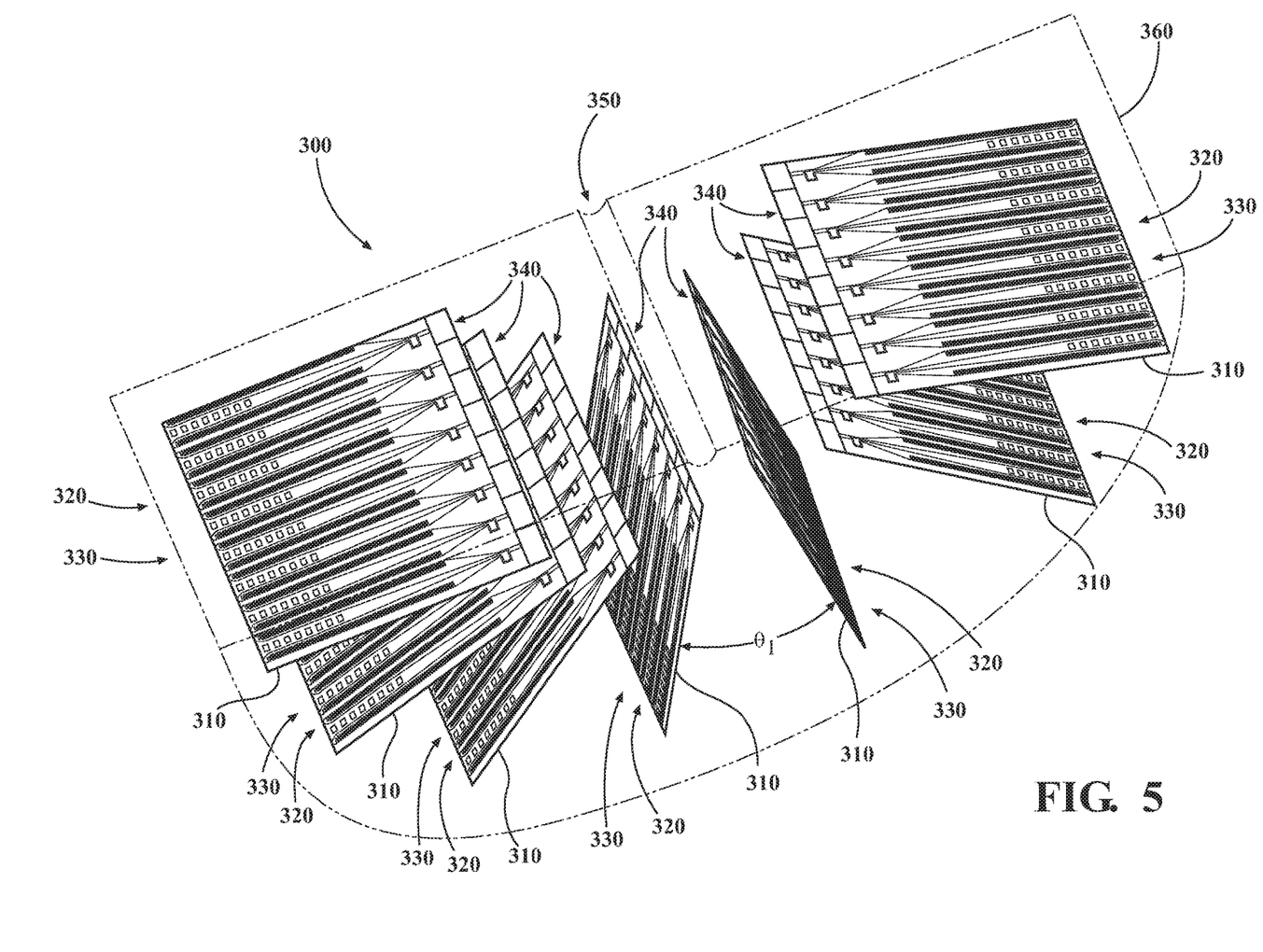

FIGS. 3-5 show an example of a first array 300 of radar boards 310. The radar boards 310 can be the same or similar to the end-fire antenna array 100 and/or radar subsystem 204 described in connection with FIGS. 1A-2. The first array 300 includes a plurality of radar boards 310 arranged in a fan-shaped array. Thus, the plurality of radar boards 310 can extend radially outward from a central region 350. The central region 350 can be a point, an axis, an area, or a volume. The radar boards 310 can be similar to the arrangement shown in FIG. 2. Each radar board can include an end-fire antenna 320. Each radar board 310 can include a transmission end 330 and a chip connection end 340.

There can be any number of radar boards 310. In the example shown, there can be seven radar boards 310. However, it will be appreciated that there can be greater or fewer than seven radar boards 310. The number of radar boards 310 can vary depending on performance requirements.

There can be any suitable spacing between the radar boards 310. In one or more arrangements, the radar board 310 can be substantially equally spaced. However, in one or more arrangements, one or more of the radar boards 310 may be unequally spaced from the other radar boards 310. Neighboring radar boards 310 in the first array 300 can be oriented as an angle θ1 relative to each other. In some arrangements, the angle θ1 can be substantially equal between the neighboring radar boards 310.

In some arrangements, the radar boards 310 can transmit signals at substantially the same frequency. In some arrangements, one or more of the radar boards 310 can transmit signals at a different frequency than the other radar boards 310. In some arrangements, each of the radar boards 310 can transmit signals at a different frequency than the other radar boards 310.

Each radar board 310 of the first array 300 can have an associated coverage area. In one or more arrangements, each radar board 310 can have a coverage area of about 18 degrees by about 120 degrees. Thus, when there are seven of such radar boards in the array, the total coverage area can be about 126 degrees by about 120 degrees. Thus, it will be appreciated that a larger and effectively three dimensional detection field can be attained.

In the example of FIGS. 3-5, there can be a two channel transmitter and six channel receiver in phased array architecture. However, it will be appreciated that the number of channels can be modified depending on performance requirements (e.g., total detection field, detection resolution, maximum detection range, etc.).

The plurality of radar boards 310 can be held in a fan-shaped array in any suitable manner. For instance, a bracket can be configured to hold each radar board 310 in place. The bracket can be operatively connected to each radar board 310. The bracket can have any suitable size, shape, and/or configuration. The bracket can be made of any suitable material.

Further, it will be appreciated that the first array 300 can be at least partly enclosed within a housing 360. The housing 360 can have any suitable shape, such as substantially semi-cylindrical or substantially semi-spherical. The housing 360 can be made of any suitable material. The housing can be made of a material with properties and/or can be otherwise sized, shaped, and/or configured to be transparent to radar signals. The housing 360 can protect the radar boards 310 from dirt, debris, and/or other substances or environmental conditions.

Figure 6:
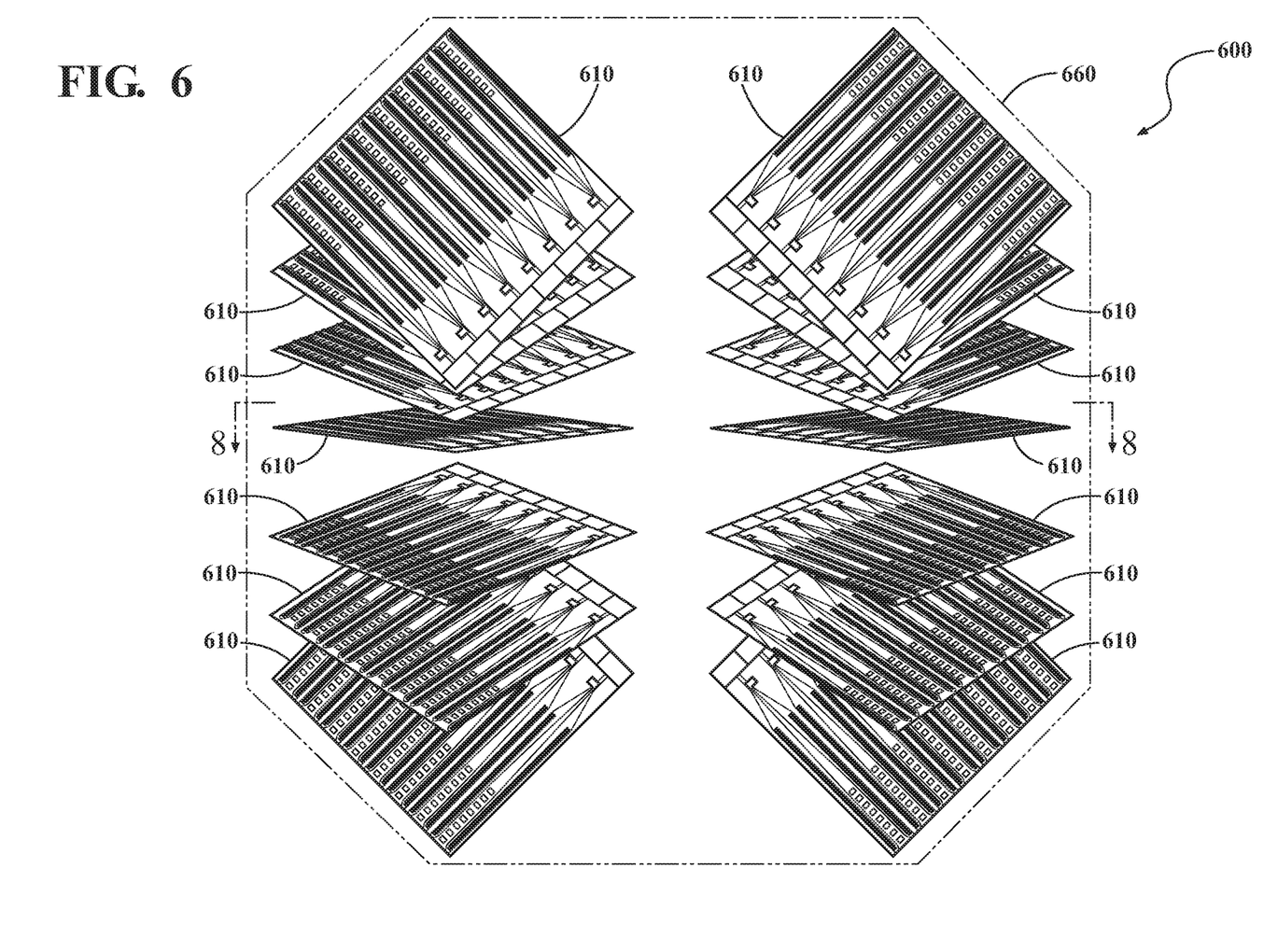
FIGS. 6-8 show different views of an example of a second array of radar boards.
Figure 7:
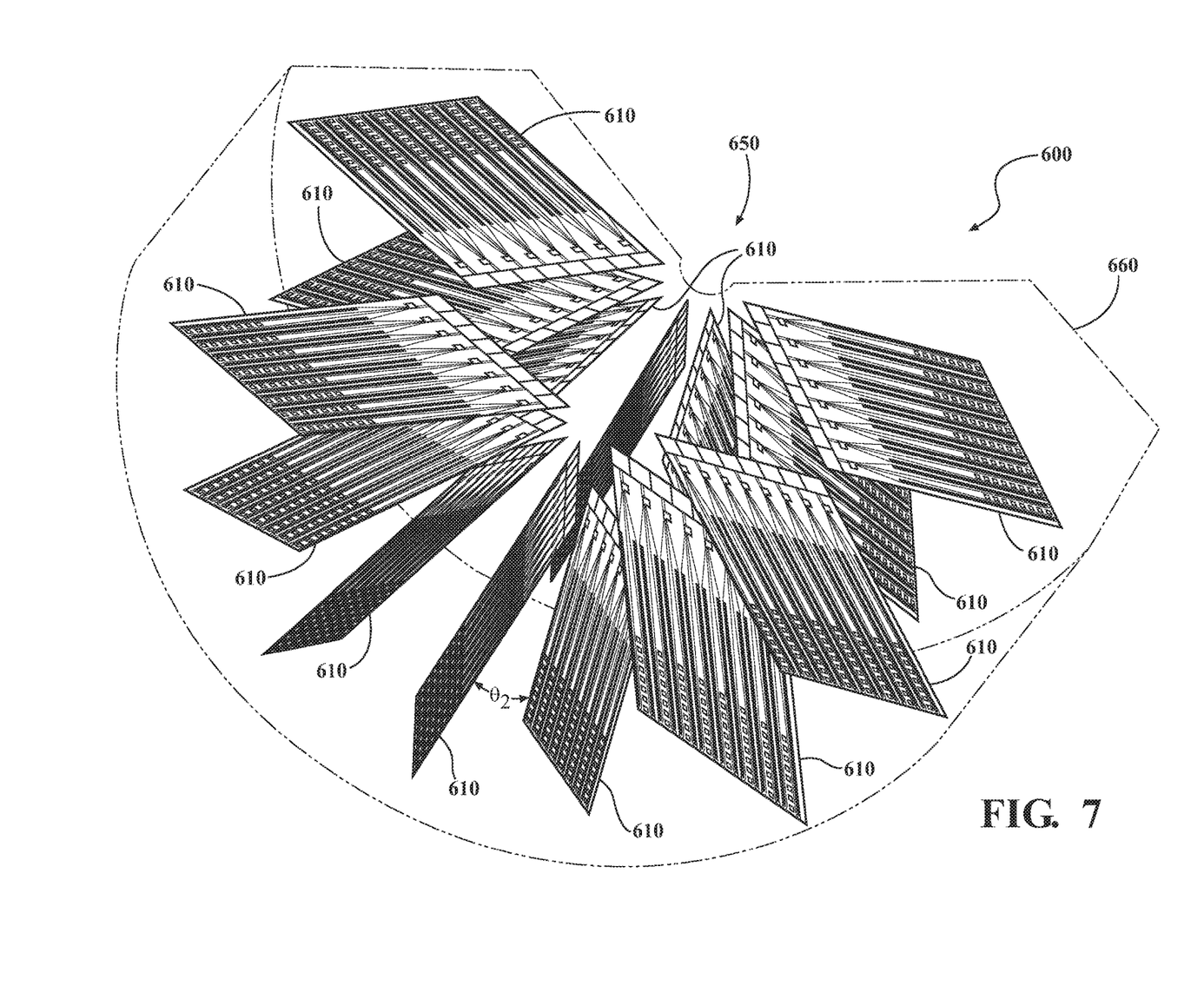
Figure 8:
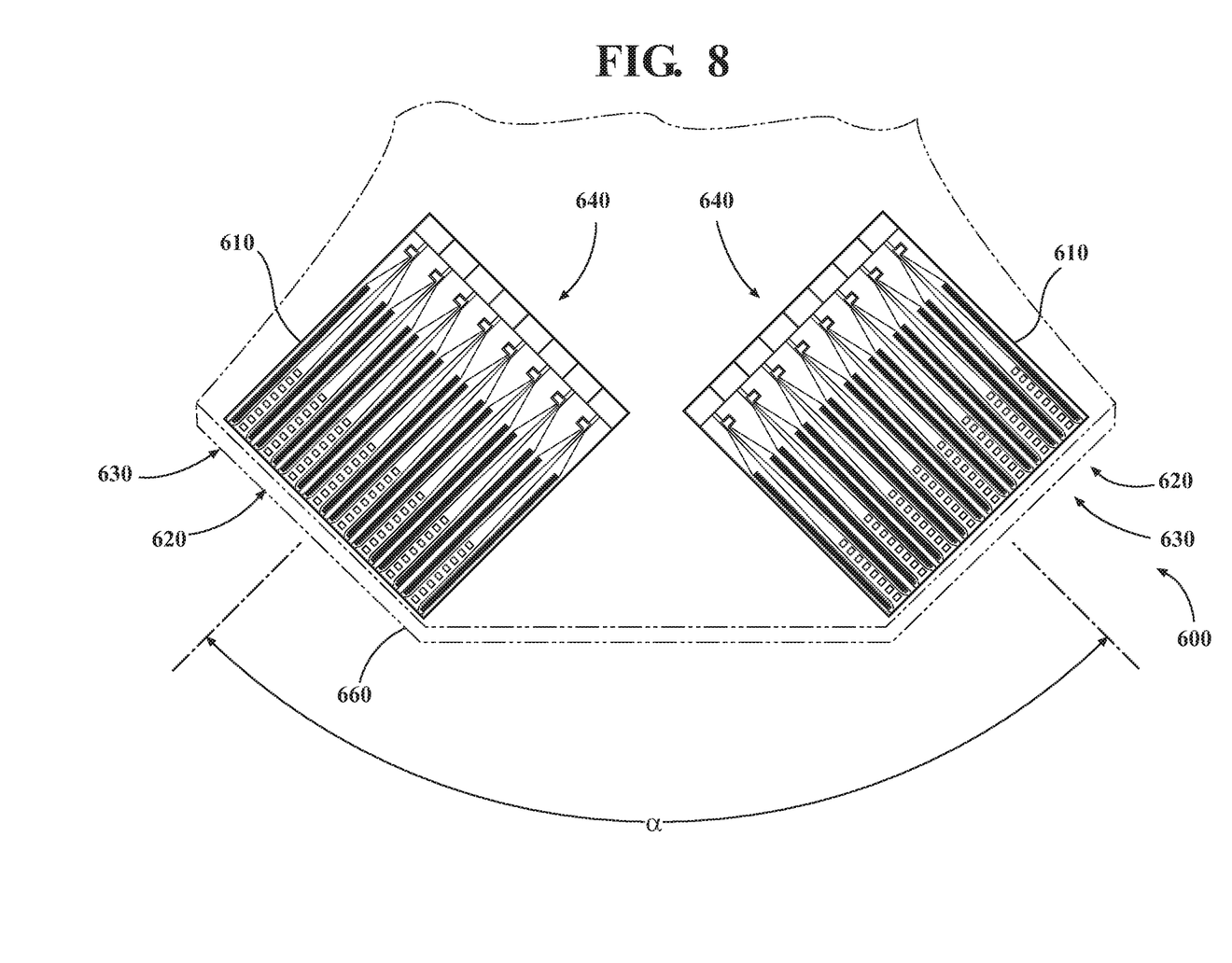

If the arrangements described above in connection with FIGS. 3-5 do not cover the desired angular resolution and/or the desired total coverage filed, then additional radar boards can be added. One example of such an arrangement is shown in FIGS. 6-8, which show an example of a second array 600 of radar boards 610 with end-fire antennas.

The second array 600 can include a plurality of radar boards 610 arranged in a fan-shaped array. The radar boards 610 can be the same or similar to the end-fire antenna array 100 and/or radar subsystem 204 described in connection with FIGS. 1A-2. The plurality of radar boards 610 can extend radially outward from a central region 650. The central region 650 can be a point, an axis, an area, or a volume. The radar boards 610 can be similar to the arrangement shown in FIG. 2. Each radar board 610 can include an end-fire antenna 620. Each radar board 610 can include a transmission end 630 and a chip connection end 640.

In the second array 600, there can be two radar boards 610 that are substantially aligned in the substantially the same plane. For example, FIG. 8 shows an example of two radar boards 610 substantially aligned in substantially the same plane. FIG. 8 is view along line 8-8 in FIG. 6. The two radar boards 610 can be arranged such that their respective transmission ends 630 face in different directions. In one or more arrangements, the transmission ends 630 of the two radar boards 610 can face in directions that are at angle α relative to each other. In one or more arrangements, the angle α can be from substantially 60 degrees to substantially 120 degrees. In one or more arrangements, the angle α can be substantially 90 degrees, as is shown in FIG. 8. However, it will be appreciated that the angle α can be greater than or less than 90 degrees.

Neighboring radar boards 610 in the second array 600 can be oriented as an angle $\theta_2$ relative to each other. In some arrangements, the angle $\theta_2$ can be substantially equal between the neighboring radar boards 610.

As a result of these arrangements, better resolution can be achieved. Moreover, the combined detection field can be doubled over the detection field provided by the arrangements in FIGS. 3-5. Of course, the number of radar boards 610 can be determined by the required specification.

The plurality of radar boards 610 can be held in a fan-shaped array in any suitable manner. For instance, a bracket can be configured to hold each radar board 610 in place. The bracket can be operatively connected to each radar board 610. The bracket can have any suitable size, shape, and/or configuration. The bracket can be made of any suitable material.

Further, it will be appreciated that the second array 600 can be at least partly enclosed within a housing 660. The housing 660 can have any suitable size, shape, and/or configuration. The housing 660 can be made of any suitable material.

Figure 9:
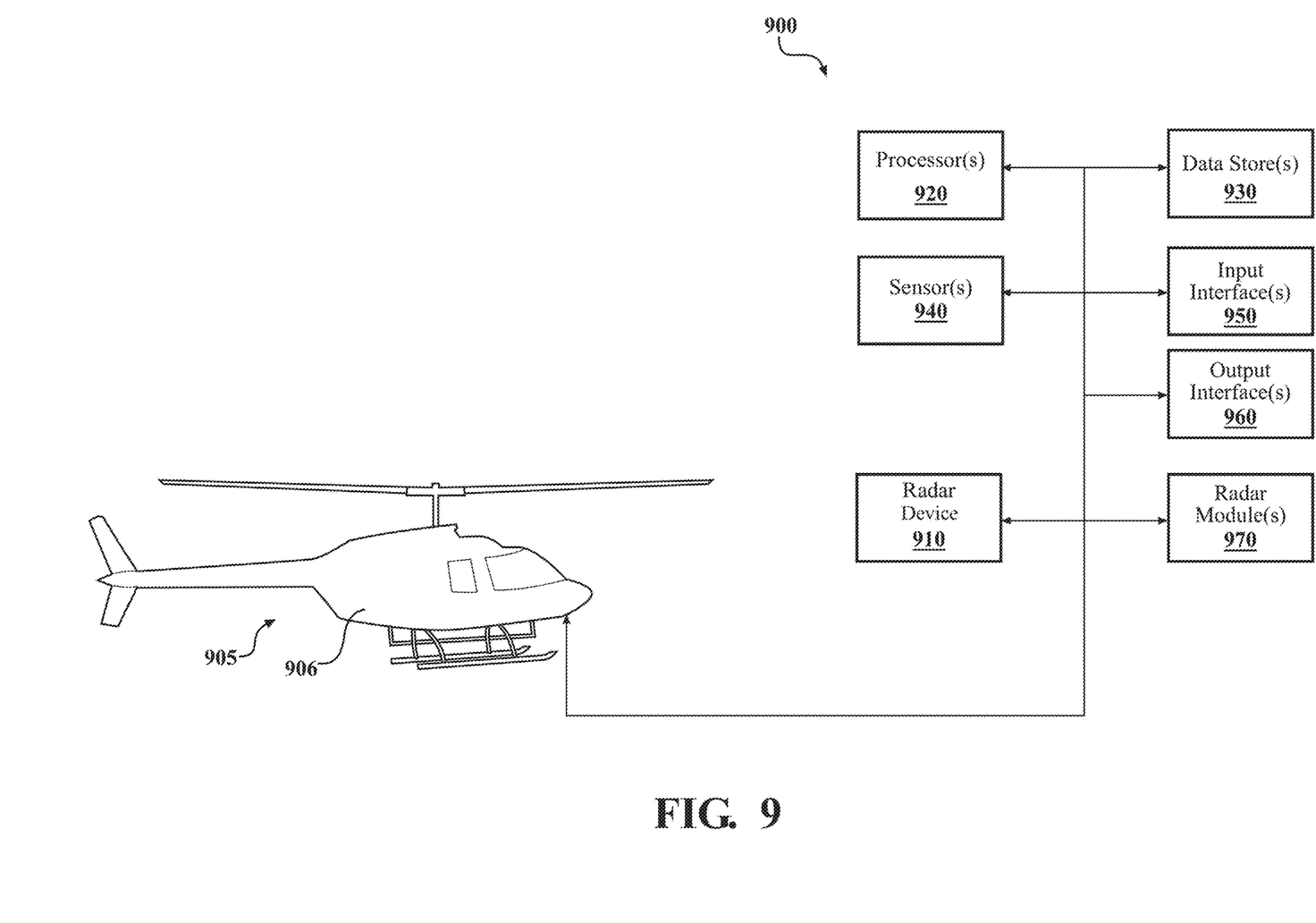
FIG. 9 is an example of a system including an array of radar boards.

Referring to FIG. 9, an example of a system 900 in which any of the above-described radar arrays can used is shown. The system 900 can include various elements. Some of the possible elements of the system 900 are shown in FIG. 9 and will now be described. However, it will be understood that it is not necessary for the system 900 to have all of the elements shown in FIG. 9 or described herein. The system 900 can have any combination of the various elements shown in FIG. 9. Further, the system 900 can have additional elements to those shown in FIG. 9. In some arrangements, the system 900 may not include one or more of the elements shown in FIG. 9. Further, the elements shown may be physically separated by large distances.

The system 900 can include an aircraft 905. In one or more arrangements, the aircraft 905 can be a helicopter 906. In one or more arrangements, the aircraft 905 can be an airplane, a drone, or a flying car. The various elements of the system 900 can be located on or within the aircraft 905. However, it will be understood that one or more of these elements can be located external to the aircraft 905. Thus, such elements are not located on, within, or otherwise carried by the aircraft 905. Indeed, one or more of the elements can be located remote from the aircraft 905. In some arrangements, the system 900 can include a watercraft (e.g., a boat) instead of the aircraft 905.

The system 900 can include a radar device 910. The radar device 910 can be any array of radar boards, including any of those described above in connection with FIGS. 3-8. In one or more arrangements, the radar device 910 can be located on the aircraft 905 so as to transmit signals in a downward direction.

The system 900 can further include one or more processors 920, one or more data stores 930, one or more sensors 940, one or more input interfaces 950, one or more output interfaces 960, and one or more radar modules 970. Each of these elements will be described in turn below.

The system 900 can include one or more processors 920. "Processor" means any component or group of components that are configured to execute any of the processes described herein or any form of instructions to carry out such processes or cause such processes to be performed. The processor(s) 920 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 920 can include at least one hardware circuit (e.g., an integrated circuit) configured to carry out instructions contained in program code. In arrangements in which there is a plurality of processors 920, such processors can work independently from each other or one or more processors can work in combination with each other. The processor(s) 920 can include a controller, such as an RFIC, as described above in connection with FIGS. 1A-2.

The system 900 can include one or more data stores 930 for storing one or more types of data. The data store(s) 930 can include volatile and/or non-volatile memory. Examples of suitable data stores 930 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 930 can be a component of the processor(s) 920, or the data store(s) 930 can be operatively connected to the processor(s) 920 for use thereby. The data store(s) 930 can store information about any of the elements of the system 900.

The system 900 can include one or more sensors 940. "Sensor" means any device, component and/or system that can detect, determine, assess, monitor, measure, quantify and/or sense something. The one or more sensors 940 can detect, determine, assess, monitor, measure, quantify and/or sense in real-time. As used herein, the term "real-time" means a level of processing responsiveness that a user, entity, component, and/or system senses as sufficiently immediate for a particular process or determination to be made, or that enables a processor to process data at substantially the same rate as some external process or faster.

In arrangements in which there are a plurality of sensors 940, the sensors 940 can work independently from each other. Alternatively, two or more of the sensors 940 can work in combination with each other. In such case, the two or more sensors 940 can form a sensor network. The sensor(s) 940 can be operatively connected to the processor(s) 920, the data store(s) 930, and/or other element of the system 900 (including any of the elements shown in FIG. 1).

The sensor(s) 940 can include any suitable type of sensor, now known or later developed. For instance, the sensor(s) 940 can include one or more sensors configured to detect, measure, or acquire data about the aircraft 905 and/or the external environment of the aircraft 905. In one or more arrangements, the sensor(s) 940 can include one or more cameras, one or more lidars, and/or one or more acoustic sensors. The sensor(s) 940 can include the radar device 910.

The system 900 can include one or more input interfaces 950. An "input interface" includes any device, component, system, element or arrangement or groups thereof that enable information/data to be entered into a machine. The input interface(s) 950 can receive an input from a user (e.g., a person) or other entity. Any suitable input interface(s) 950 can be used, including, for example, a keypad, display, touch screen, multi-touch screen, button, joystick, mouse, trackball, microphone, gesture recognition, and/or combinations thereof.

The system 900 can include one or more output interfaces 960. An "output interface" includes any device, component, system, element or arrangement or groups thereof that enable information/data to be presented to a user (e.g., a person) or other entity. The output interface(s) 960 can present information/data to a user or other entity. The output interface(s) 960 can include a display, an earphone, haptic device, and/or speaker. Some components of the system 900 may serve as both a component of the input interface(s) 950 and a component of the output interface(s) 960.

The system 900 can include one or more modules. The modules can be implemented as computer readable program code that, when executed by a processor, implement one or more of the various processes described herein. One or more of the modules can be a component of the processor(s) 920, or one or more of the modules can be executed on and/or distributed among other processing systems to which the processor(s) 920 is operatively connected. The modules can include instructions (e.g., program logic) executable by one or more processor(s) 920. Alternatively or in addition, one or more data stores 930 may contain such instructions. The modules described herein can include artificial or computational intelligence elements, e.g., neural network, fuzzy logic or other machine learning algorithms. Further, the modules can be distributed among a plurality of modules.

The system 900 can include one or more radar modules 970. The radar module(s) 970 can include profiles and logic for controlling the radar arrays according to arrangements herein. The radar module(s) 970 can be configured to determine when the radar arrays should be activated or deactivated. The radar module(s) 970 can be configured to do so in any suitable manner, such as automatically, continuously, periodically, irregularly, randomly, or in response to a user input (e.g., a command provided on the input interface(s) 950).

The radar module(s) 970 can be configured to process or analyze data or information acquired by the radar arrays. The radar module(s) 970 can receive raw data from the radar arrays and/or from the data store(s) 930. The radar module(s) 970 can use profiles, parameters, or setting loaded into the radar module(s) 970 and/or stored in the data store(s) 930. The radar module(s) 970 can analyze data acquired by the radar arrays to determine an appropriate action for the aircraft. For instance, the radar module(s) 970 can analyze data acquired by the radar arrays, alone or in combination with other data (e.g., data from the data store(s) 930, data from the sensor(s) 940, etc.), to generate a model of the environment. Such a model may be useful at different times during the operation of the aircraft, such as landing. The radar module(s) 970 can to identify objects and/or characteristics of objects based on radar data, image data, other sensor data, and/or other data.

In one or more arrangements, the radar module(s) 970 can receive radar data and image data corresponding to objects in the environment. The radar module(s) 970 can determine the presence of and characteristics of an object based on the radar data. The radar module(s) 970 can also determine characteristics of the object based on the image data. The radar module(s) 970 can verify the characteristics of the object that were determined based on the radar data using the received image data. The radar module(s) 970 can also supplement the characteristics of the object that were determined based on the radar data using the received image data. For example, the radar module(s) 970 can determine that an object is 5 feet away from the aircraft based on the radar data and may determine that the object has a height of 3 feet based on the image data. In some instances, the radar module(s) 970 can be configured to present a representation of the environment to a pilot of the aircraft. In some instances, the radar module(s) 970 can be configured to present alerts or warning to a pilot of the aircraft, such as a warning about objects in the environment, a potential collision, etc.

The various elements of the system 900 can be communicatively linked to one another or one or more other elements through one or more communication networks. As used herein, the term "communicatively linked" can include direct or indirect connections through a communication channel, bus, pathway or another component or system. A "communication network" means one or more components designed to transmit and/or receive information from one source to another. The data store(s) 930 and/or one or more other elements of the system 900 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

One example implementation of end-fire antenna arrays described herein can be in connection with helicopters. In particular, the end-fire antenna arrays can be used to assist the helicopter during landing. Thus, when the helicopter is in the process of landing, the end-fire antenna arrays can scan generally downwardly toward the landing site. However, due to the unique arrangement of the end-fire antenna arrays described herein, an enlarged three dimensional detection field of view of the environment can be obtained, even in severe weather or dusty/smoky environments. As a result, the helicopter can have accurate data about whether there are any hazards in the environment that would pose a threat to the helicopter during landing. If such hazards are present, the pilot can steer the helicopter away from them and find an alternative landing route or an alternative landing spot. If there are no hazards present, then the helicopter can commence or continue the landing process with confidence that a safe landing free of hazards will occur.

Again, arrangements described herein can use existing automotive radar technology. Currently, U.S. federal regulations, such as those promulgated by the U.S. Federal Communications Commission, limit the detection range of automotive radar to up to 150 meters. However, in the context of an aircraft, the detection range of the radar would not be limited by this regulation. To extend the detection range from the typical automotive range of up to 150 meters to, for example, 300 meters for an aircraft application, the radar power output can be increased.

It will be appreciated that arrangements described herein can provide numerous benefits, including one or more of the benefits mentioned herein. For example, arrangements described herein can expand the use of automotive radar (with end-fire antennas) to helicopter or other aircraft application at a lower cost compared to typical aircraft radar. Arrangements described herein can achieve an expanded radar detection field of view, such as up to substantially 180 degrees, by integrating multiple automotive radar with end-fire antennas. Arrangements described herein can achieve an expanded radar detection field without the use of moving parts for the radar scan. Arrangements described herein can achieve an expanded radar detection field entirely by electronic scan beams. According to Arrangements described herein, to further reduce the total cost of multiple radars, transmitter signal can be shared as much as it physically could make connection to antenna. Arrangements described herein can leverage the large volume of automotive radar to cost effectively apply it to non-automotive applications (e.g., helicopter landing or other aircraft use). Arrangements described herein can introduce a cross-industry market application, and solutions to overcome for cross-industry usage are also introduced arrangements described herein.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A radar device comprising:
    a plurality of end-fire antenna arrays, the plurality of end-fire antenna arrays being arranged in a substantially semi-cylindrical fan-shaped array such that the plurality of end-fire antenna arrays extend radially outward from a central region, each end-fire antenna array having a transmission end oriented in a different direction than the other end-fire antenna arrays, the plurality of end-fire antenna arrays creating a collective detection field, each of the plurality of the end-fire antenna arrays being an automotive end-fire antenna array, each of the plurality of the end-fire antenna arrays having a detection range of more than 150 meters.

2. The radar device of claim 1, wherein the plurality of end-fire antenna arrays are substantially equally spaced in the substantially semi-cylindrical fan-shaped array.

3. The radar device of claim 1, wherein the plurality of end-fire antenna arrays are substantially identical to each other.

4. The radar device of claim 1, wherein each of the plurality of end-fire antenna arrays is located in a different plane than the rest of the plurality of end-fire antenna arrays.

5. The radar device of claim 1, wherein two of the plurality of end-fire antenna arrays are located in substantially the same plane.

6. The radar device of claim 5, wherein the two of the plurality of end-fire antenna arrays are located on the same printed circuit board.

7. The radar device of claim 5, wherein the transmission ends of the two of the plurality of end-fire antenna arrays face in directions that are at an angle from substantially 60 degrees to substantially 120 degrees relative to each other.

8. The radar device of claim 1, wherein the collective detection field is substantially semi-spherical.

9. The radar device of claim 1, further including a housing, wherein the plurality of end-fire antenna arrays are located at least partially within the housing.

10. A system comprising:
a vehicle, the vehicle being one of a helicopter or a drone; and
a radar device carried on the vehicle, the radar device including a plurality of end-fire antenna arrays, the plurality of end-fire antenna arrays being arranged in a substantially semi-cylindrical fan-shaped array such that the plurality of end-fire antenna arrays extend radially outward from a central region, each end-fire antenna array having a transmission end oriented in a different direction than the other end-fire antenna arrays, the plurality of end-fire antenna arrays creating a collective detection field, each of the plurality of the end-fire antenna arrays being an automotive end-fire antenna array, each of the plurality of the end-fire antenna arrays having a detection range of more than 150 meters.

11. The system of claim 10, wherein the radar device is located on the vehicle so as to transmit signals in a downward direction.

12. The system of claim 10, wherein the radar device is fixed in position on the vehicle, whereby the end-fire antenna arrays are not movable.

13. The system of claim 10, further including a housing, wherein the plurality of end-fire antenna arrays are located at least partially within the housing.

14. The system of claim 10, wherein each of the plurality of end-fire antenna arrays is located in a different plane than the rest of the plurality of end-fire antenna arrays.

15. The system of claim 10, wherein two of the plurality of end-fire antenna arrays are located in substantially the same plane.

16. The system of claim 15, wherein the two of the plurality of end-fire antenna arrays are located on the same printed circuit board.

17. The system of claim 16, wherein the transmission ends of the two of the plurality of end-fire antenna arrays face in directions that are at an angle from substantially 60 degrees to substantially 120 degrees relative to each other.

18. The system of claim 10, wherein the collective detection field is substantially semi-spherical.

19. A radar device comprising:
a plurality of printed circuit boards arranged in a substantially semi-cylindrical fan-shaped array such that the plurality of printed circuit boards extend radially outward from a central region; and
a plurality of end-fire antenna arrays, each end-fire antenna array having a transmission end oriented in a different direction than the other end-fire antenna arrays, the plurality of end-fire antenna arrays being arranged in pairs on a respective one of the plurality of printed circuit boards such that each pair of end-fire antenna arrays are located in substantially the same plane and such the transmission ends of each pair of end-fire antenna arrays facing in directions that are at an angle from substantially 60 degrees to substantially 120 degrees relative to each other, the end-fire antenna arrays not being movable, each of the plurality of the end-fire antenna arrays having a detection range of more than 150 meters,
the plurality of end-fire antenna arrays configured to create a collective detection field, the collective detection field being substantially semi-spherical.

20. The radar device of claim 19, wherein the plurality of printed circuit boards is held in the substantially semi-cylindrical fan-shaped array by a bracket.

21. The radar device of claim 19, wherein the plurality of end-fire antenna arrays have a bandwidth of substantially 80 gigahertz (GHz).

* * * * *